Patented Sept. 1, 1953

2,650,873

UNITED STATES PATENT OFFICE 2,650,873

PREPARATION OF TITANIUM
TETRACHLORIDE

Owen F. Sprague, Niagara Falls, N. Y., assignor to National Lead Company, New York, N. Y., a corporation of New Jersey No Drawing. Application November 15, 1952,
Serial No. 320,825

7 Claims. (Cl. 23—87)

This invention relates to a novel method for the preparation of highly pure titanium tetrachloride.

In recent years the industrial demand for titanium tetrachloride has increased markedly due in large measure to the establishment and growth of the titanium metal industry. Prior to the present invention, the commercial preparation of titanium tetrachloride was based upon the chlorination of a titaniferous material, e. g. ilmenite, rutile, titanium carbide, titanium cyanonitride and the like, in the presence of a carbonaceous reducing agent. In addition to the difficulty and danger attached to the handling of chlorine or other powerful chlorinating agents at high temperatures, these prior art methods gave rise to the formation of small amounts of phosgene which contaminated the product and adversely affected its commercial utility, particularly its utility for the preparation of titanium metal. For instance, it has been found that when titanium tetrachloride containing phosgene is converted to metal, the metal becomes contaminated with carbon and oxygen, and, as a consequence, its brittleness is greatly increased and its ductility decreased. By means of the present invention, titanium tetrachloride is produced which is completely free of phosgene or other carbon and oxygen containing impurities as well as the other common impurities, e. g. vanadium, manganese, iron and silicon found in titanium tetrachloride produced by prior art methods.

The principal object, therefore, is the preparation of highly pure titanium tetrachloride. Another object of the present invention is the preparation of titanium tetrachloride free from oxygen and carbon containing impurities. Still another object is the preparation of titanium tetrachloride free from impurities which impart brittleness to titanium metal and reduce its ductility. These and other objects of the present invention will become apparent from the following description:

In its broadest aspects the present invention contemplates mixing an alkaline earth metal chloride, including magnesium chloride, with an alkali metal fluotitanate, heating the mixture at a temperature above 350° C., preferably within the range 350° to 1200° C., and recovering the titanium tetrachloride evolved from the reaction between the alkaline earth metal chloride and the fluotitanate.

The mixing of the reactants, i. e., the chloride and fluotitanate, may be accomplished in any convenient manner and in any suitable vessel. Inasmuch as the product, titanium tetrachloride, is evolved during the reaction as a gas, the reaction vessel should be equipped with means for carrying the gas away from the reaction vessel, condensing it and collecting it as a liquid. One convenient apparatus for effecting the mixing of the reactants, and, if desired, for carrying out the reaction, is a ball mill provided with suitable outlet and condenser means.

Ordinarily, the temperatures employed are such that the reaction is carried out in the solid state. However, it has been found that a satisfactory means for carrying out the reaction smoothly to completion is to cause the reaction to take place in the molten state. This may be accomplished preferably by adding to the reaction mixture a small amount of a non-reactive flux salt, that is to say, a salt, e. g., sodium chloride, which forms relatively lower melting mixtures with the chloride reactant. The amount of such salt to be employed will be sufficient to produce a fluid reaction mass. Usually between about 0.1 mole and 1.0 mole will be found to be sufficient.

Thus, magnesium chloride itself melts at 708° C.; a mixture of about 40% $MgCl_2$ and about 60% LiCl melts at 570° C.; a mixture of about 45% $MgCl_2$ and 55% NaCl melts at 430° C., and a mixture of about 64% $MgCl_2$ and 36% KCl melts at 470° C.

Fluidity of the reaction mixture can also be achieved by using an excess of the chloride over the amount required to react with the fluotitanate. Thus, a reaction mixture containing about 10.0% excess of magnesium chloride will, when heated to about 700° C., produce a fluid reaction mass. It will be understood that when employing other chlorides, e. g. the chlorides of calcium, strontium or barium, the temperature may have to be increased in order to produce fluidity due to the higher melting points of these compounds.

As to the reactants, the alkaline earth metal chlorides include the chlorides of calcium, barium, and strontium, and these together with magnesium chloride, constitute the source of chlorine which is recovered as titanium tetrachloride. The fluotitanates are compounds corresponding to the formula $M_2TiF_6$ where M is an alkali metal, e. g. sodium or potassium. The proportions of the reactants in the reaction mixture should be such that for every mole of fluotitanate there will be two moles of the chloride, which is the stoichiometric relation. As has been stated, if it be desired to conduct the reaction in the molten state, an excess of the chloride will be employed.

As to the reaction temperature, it has been found that titanium tetrachloride begins to be evolved at about 350° C. The evolution is increasingly rapid up to 1200° C., beyond which temperature the reaction becomes so intense that it is virtually impossible, with materials of construction presently available, to control it. Temperatures between 500° C. and 750° C. have been found most suitable, although where barium chloride, which has a melting point of 962° C., is used, it may be found necessary to approach 1000° C. if fluidity is desired.

It is important that moisture be excluded during the mixing and during the period of the reaction.

The following example more particularly illustrates the present invention:

Example 240 grams of finely divided potassium fluotitanate, $K_2TiF_6$ and 190.5 grams of magnesium chloride, $MgCl_2$, were thoroughly mixed and placed in a sealed reaction vessel equipped with a single outlet connected to a water-cooled condenser. The vessel and its contents were heated to about 700° C. and maintained at this temperature until vapors of titanium tetrachloride were no longer evolved.

It was found that the reaction had gone substantially to completion. The product was water-white liquid titanium tetrachloride free from phosgene and other carbon and oxygen containing impurities as well as inorganic coloring impurities such as vanadium, chromium, iron and the like.

The titanium tetrachloride produced according to the present invention is especially suited for the production of titanium metal, and when so used, yields a ductile metal of high degree of purity.

While this invention has been described and illustrated by the example shown, it is not intended to be strictly limited thereto and other modifications and variations may be employed within the scope of the following claims.

I claim:

1. Method for the preparation of titanium tetrachloride which comprises mixing together an alkaline earth metal chloride, including magnesium chloride, with an alkali metal fluotitanate, heating the mixture at a temperature above 350° C., and recovering the titanium tetrachloride evolved.

2. Method for the preparation of titanium tetrachloride which comprises mixing together an alkaline earth metal chloride, including magnesium chloride, with an alkali metal fluotitanate, heating the mixture at a temperature within the range 350° to 1200° C., and recovering the titanium tetrachloride evolved.

3. Method for the preparation of titanium tetrachloride which comprises mixing an alkali metal fluotitanate with at least a stoichiometric amount of an alkaline earth metal chloride, including magnesium chloride, heating the mixture at a temperature between 350° and 1200° C., and recovering the titanium tetrachloride evolved.

4. Method for the preparation of titanium tetrachloride which comprises mixing an alkali metal fluotitanate with a sufficient excess of an alkaline earth metal chloride over the stoichiometric amount to produce a fluid condition when the mixture is heated between 350° and 1200° C., heating the mixture at a temperature between 350° and 1200° C., and recovering the titanium tetrachloride evolved.

5. Method according to claim 4 wherein the non-reacting fluxing salt is sodium chloride.

6. Method for the preparation of titanium tetrachloride which comprises mixing an alkali metal fluotitanate with at least a stoichiometric amount of an alkaline earth metal chloride and a sufficient amount of a non-reacting fluxing salt to produce a fluid condition when the mixture is heated between 350° and 1200° C., and recovering the titanium tetrachloride evolved.

7. Method for the preparation of titanium tetrachloride which comprises mixing finely divided potassium fluotitanate with at least a stoichiometric amount of magnesium chloride, heating the mixture at about 700° C., and maintaining the mixture at this temperature until the evolution of titanium tetrachloride is substantially completed, while recovering the titanium tetrachloride so evolved.

OWEN F. SPRAGUE.

No references cited.